United States Patent [19]
Checcucci

[11] 3,902,587

[45] Sept. 2, 1975

[54] MACHINE FOR SEPARATING OBJECTS OF VARIABLE SHAPE AND TRANSFERRING THEM TO PACKAGING MACHINES

[76] Inventor: Tommaso Mori Checcucci, Viale Solferino 52, Parma, Italy, 43100

[22] Filed: Apr. 22, 1974

[21] Appl. No.: 463,081

[30] Foreign Application Priority Data
Apr. 26, 1973 Italy.................................. 42518/73

[52] U.S. Cl.................. 198/34; 53/159; 104/172 B; 198/37
[51] Int. Cl.............................................. B65g 47/28
[58] Field of Search............ 198/29, 30, 34, 37, 162, 198/DIG. 19; 104/88, 172 B, 253; 53/159, 164, 236

[56] References Cited
UNITED STATES PATENTS

| | | | |
|---|---|---|---|
| 2,590,823 | 3/1952 | Rhodes | 198/34 X |
| 2,728,508 | 12/1955 | Marasso | 198/34 |
| 3,319,765 | 5/1967 | Hasenwinkle | 198/34 |
| 3,365,857 | 1/1968 | Liedtke | 53/236 |
| 3,724,390 | 4/1973 | Beer | 104/172 B |

*Primary Examiner*—Robert B. Reeves
*Assistant Examiner*—Thomas E. Kocovsky
*Attorney, Agent, or Firm*—Guido Modiano; Albert Josif

[57] ABSTRACT

Machine for separating objects of variable shape and transferring them to packing machines comprising a conveyor for feeding the objects to a sliding surface and a reception conveyor at the end of the sliding surface. Transporters are provided for dragging the objects along the sliding surface. Each transporter comprises a body from which two prongs project through longitudinal slots defined in the sliding surface, for engaging the objects to be separated. A flexible member having an endless loop configuration drivers the transporters along a closed trajectory one portion of which is parallel with the sliding surface. Intercepting means controlled by photoelectric cells are provided for individually intercepting and freeing the transporters.

5 Claims, 9 Drawing Figures

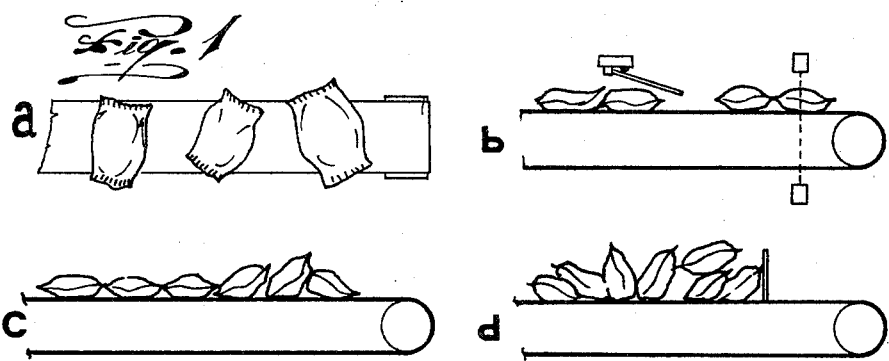
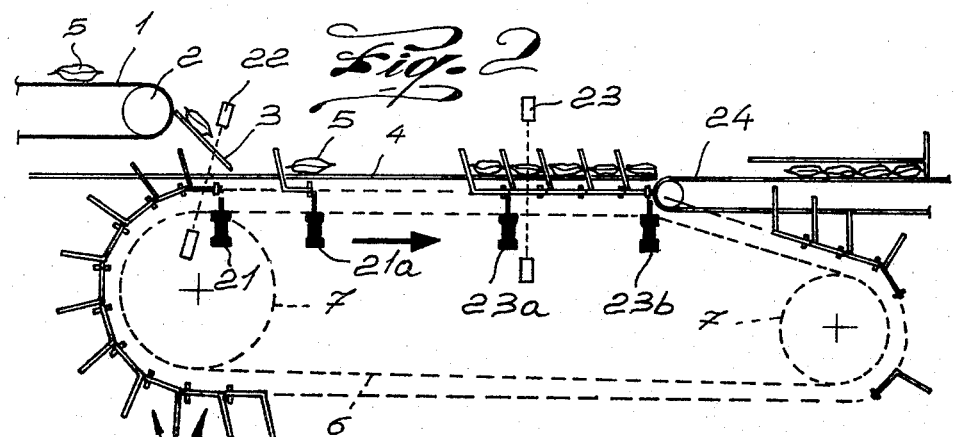
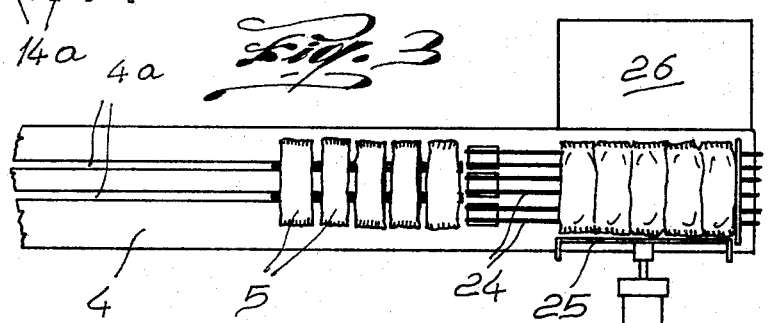
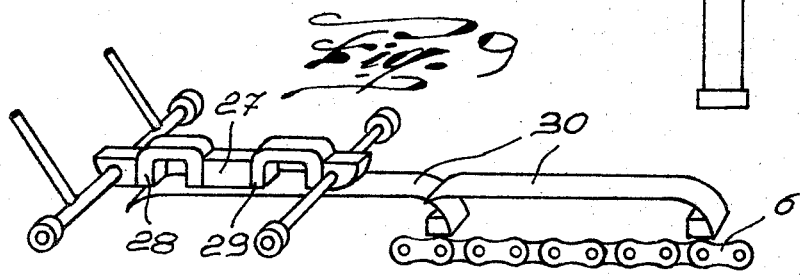

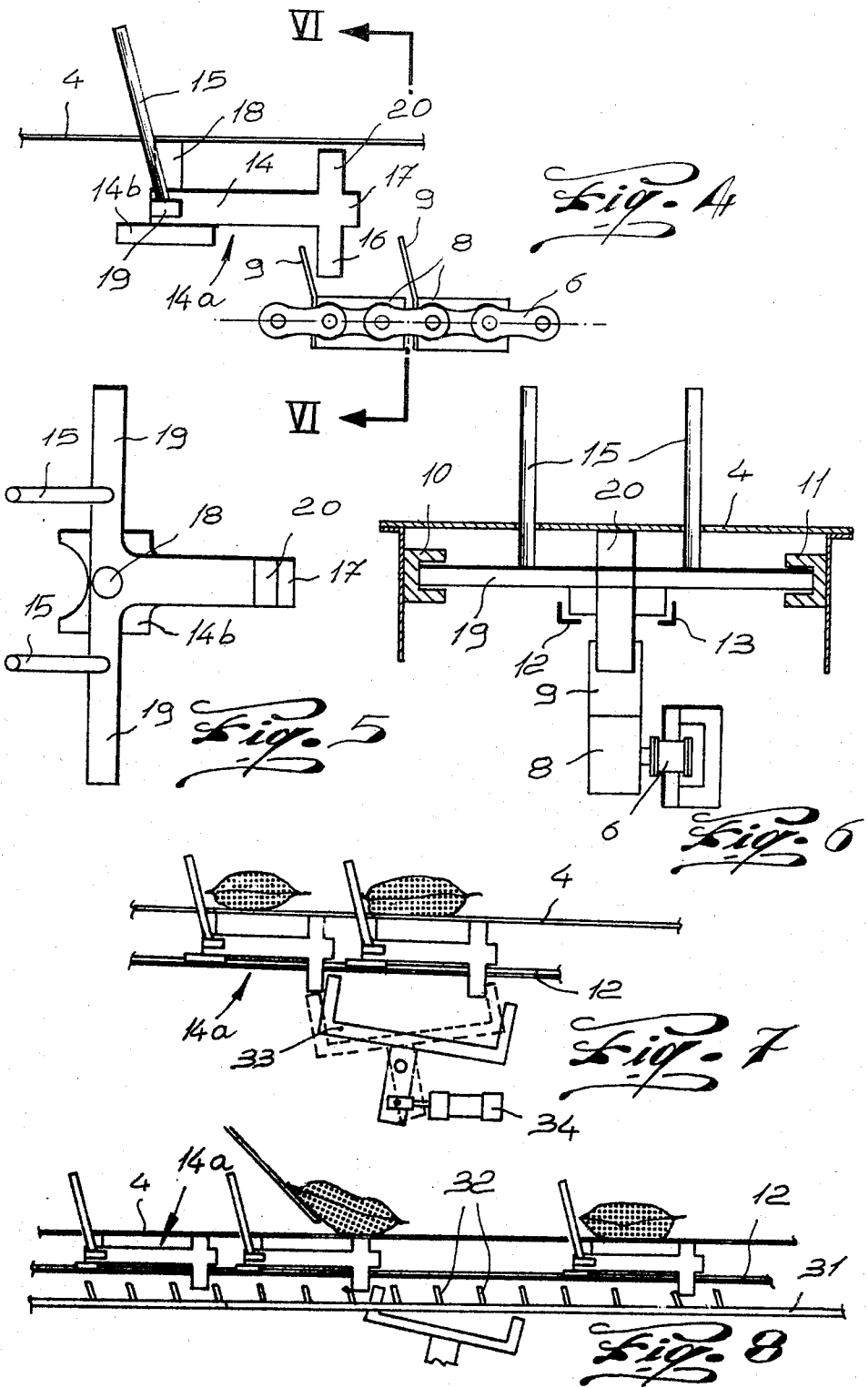

MACHINE FOR SEPARATING OBJECTS OF VARIABLE SHAPE AND TRANSFERRING THEM TO PACKAGING MACHINES

BACKGROUND OF THE INVENTION

This invention relates to a machine for separating objects of variable shape and transferring them to packaging machines.

At the present time the packaging of objects of variable shape, such as bags of flour, sweets, popcorn, crisps etc., gives rise to certain disadvantages due to:
  a. the difficulty of maintaining precise positioning with respect to the transfer conveyor (see FIG. 1a);
  b. the difficulty of counting, whether by mechanical detection by means of a microswitch or by photoelectric visualisation (see FIG. 1b);
  c. the difficulty of grouping the objects in an ordered manner because of their compressibility (see FIG. 1c);
  d. the difficulty of creating reserves of objects at rest (see FIG. 1d);
  e. the difficulty of counting, stopping and starting the objects at high working speeds.

SUMMARY OF THE INVENTION

The object of this invention is to provide a machine in which the aforementioned difficulties are eliminated.

This object is attained by a machine comprising a feed conveyor for the objects, a sliding surface for the objects arriving from said conveyor, at the end of which there is a reception conveyor, transporters for dragging said objects along said sliding surface, guide elements for guiding said transporters along a closed trajectory one portion of which extends parallel to said sliding surface, a flexible member in the form of an endless loop provided with elements arranged to interfere with said transporters, said flexible member being driven so that the transporters engage with the objects deposited by the feed conveyor on to the sliding surface and thrust them towards the reception conveyor, means being provided for intercepting the transporters controlled by means for detecting the objects arriving from the feed conveyor in such a manner as to individually free the transporters for each object detected.

BRIEF DESCRIPTION OF THE DRAWINGS

Further characteristics will be more evident from the description given hereinafter of one embodiment of the invention, illustrated by way of example in the accompanying drawings in which:
  FIG. 1 shows various disturbances which may arise during the handling of bags of various shapes;
  FIG. 2 is a diagrammatic elevational view of the machine according to the invention;
  FIG. 3 is a diagrammatic plan view of the machine of FIG. 2;
  FIG. 4 is a side elevation of a transporter and the elements which interfere with it;
  FIG. 5 is a plan view of the transporter of FIG. 4;
  FIG. 6 is a view on the line VI—VI of FIG. 4;
  FIG. 7 is an elevational view of a further embodiment of the interception members;
  FIG. 8 is an elevational view of a further embodiment of the elements which interfere with the transporters;
  FIG. 9 is a perspective view of a second embodiment of a transporter and the dragging elements.

DESCRIPTION OF THE PREFERRED EMBODIMENT

With reference to the stated drawings, the figure shows a belt 1 for feeding objects, for example bags of flour 5, wound over rollers of which only that indicated by the reference numeral 2 is visible in the drawing.

At the end of the belt 1 there is an inclined chute 3 which conducts the bags on to a horizontal sliding surface 4.

Below the surface 4 there is an endless chain 6 mounted on gear wheels 7 rotatably supported on the frame of the machine and of which one is connected to the drive means. The chain is driven with continuous motion and blocks 8 are fixed on it, each of which carries a resilient blade 9 extending outwards (FIG. 4).

The chain 6 comprises a portion which lies parallel and below the sliding surface 4.

Around the chain 6 extend two pairs of guides 10, 11 and 12, 13 (see FIG. 6) which are in the form of endless loops and are parallel to the chain 6.

The transporters 14a, shown in FIGS. 4, 5 and 6, freely slide in the guides 10, 11 and 12, 13 and are dragged by the resilient blades 9 rigid with the chain 6.

The transporters 14a consist of a central body 14 from which extend two prongs 15 which, along the upper horizontal portion of the chain 6, project beyond the surface 4 through two longitudinal slots 4a in this latter and are arranged to thrust the bags 5 on the sliding surface 4 by the fact that a lower appendix 16 of the transporter can engage with one of the resilient blades 9 of the chain.

The transporter 14a comprises a front projection 17 which establishes the distance and absorbs the collisions between one transporter and the next.

From the central body 14 project a pair of lateral fins 19 the ends of which slide in the guides 10, 11, and upperly two projections 18, 20 which act as sliding blocks and slide under the central portion of the surface 4 between the slots 4a. A plate 14b is rigid with the body 14 and slides between the guides 12, 13.

The described transporters are continuously dragged by the resilient blades 9 which engage with the appendices 16, and are kept in a position for receiving the bags by an escapement mechanism comprising two jacks 21, 21a controlled by a photoelectric barrier 22 installed along the chute 3 which connects the belt 1 with the sliding surface 4 and distanced apart by a length equal to the length of two transporters. When the photoelectric barrier 22 detects the passage of a bag on the slide 3, it supplies a signal to the jack 21a which is moved from its position of intercepting the transporters into a position in which they are free, and simultaneously the jack 21 is driven into the intercepting position. The first transporter 14a can thus be dragged forwards by the blades 9. After a time interval, adjusted by a timer, the jacks 21, 21a are returned to their original positions. The return of the jacks into this position takes place after a period of time such that the jack 21a manages to intercept the transporter immediately following the one left free, and consequently also intercepts all the remaining transporters which are continuously thrust forwards by the flexible blades 9.

The various working stages can be adjusted in such a manner that the prongs 15 of the transporter 14a engage with the bag 5 while this latter is still moving on the chute 3, so as to avoid the acceleration or impact which would occur if acting on an object at rest.

It is evident that in the case of the described machine, the counting of the bags is not prejudiced by any erroneous arrangement of the bags on the band 1, as illustrated in FIGS. 1a, b, c, d. A second escapement mechanism is provided which embraces the required number of them and consists of two jacks 23a, 23 b, which are forced into positions of intercepting and respectively freeing the transporters 14a when a photoelectric barrier 23 indicates that the predetermined number has been reached. This happens when the light ray of the photoelectric barrier has been interrupted for a time in excess of that which would signify the transit of the last bag of the group. As the prongs 15 withdraw because of the descent of the transporters, the bags 5 are thrust on to a belt conveyor 24.

From the description it can be seen that the bags are abandoned when there is no further possibility of uncontrollable movements.

When the bags, which have been counted and grouped together, reach the end of the conveyor 24, and pusher 25 can expel them on to a tray 26 situated at the side (see FIG. 3) to form on this latter an ordered and complete layer.

The invention may undergo numerous modifications. For example the transporter may comprise a body 27 in which instead of the appendix 16 there are provided magnets 28, 29 which remain in sliding engagement on blades 30 carried by the chain 6 and arranged in the manner of fish scales to permit articulation of the chain.

Furthermore (see FIG. 8) the drive chain 6 may consist of a flexible belt 31 provided with elastically yieldable teeth 32.

In a further embodiment, in place of the jacks 21, 21a, a fork 33 of U configuration is provided, supported in an oscillating manner. The fork 33 is driven by a jack 34 in such a manner that in one position its prongs intercept the front transporter and in the other position they intercept those which follow said front transporter, which can thus be dragged forwards by the blades 9.

I claim:

1. Machine for separating objects of variable shape and transferring them to packaging machines, comprising a feed conveyor for the objects, a sliding surface for the objects arriving from said conveyor, at the end of which there is a reception conveyor, transporters for dragging said objects along said sliding surface, guide elements for guiding said transporters along a closed trajectory one portion of which extends parallel to said sliding surface, a flexible member in the form of an endless loop provided with elements arranged to interfere with said transporters, said flexible member being driven so that the transporters engage with the objects deposited by the feed conveyor on to the sliding surface and thrust them towards the reception conveyor, means being provided for intercepting the transporters controlled by means for detecting the objects arriving from the feed conveyor in such a manner as to individually free the transporters for each object detected.

2. Machine as claimed in claim 1, in which interception means are disposed along the terminal portion of said sliding surface for releasing groups of a predetermined number of objects, comprising a pair of jacks controlled by a photoelectric cell barrier in such a manner that when one jack is in the intercepting position, the other is in the position of free passage and vice versa.

3. Machine as claimed in claim 1, in which said transporters comprise a central body guided in guides of which one portion extends parallel to the sliding surface, two prongs projecting from said central body through longitudinal slots parallel to said guides and beyond the sliding surface for dragging the objects, said body being provided on lower side with an appendage arranged for engagement by resilient blades rigid with the flexible element and projecting from it.

4. Machine as claimed in claim 1 in which the intercepting means consist of an escapement mechanism formed from a fork of U configuration supported in an oscillating manner and controlled by a jack in such a manner that when one prong of said fork is in the position in which it intercepts a transporter the other prong is in a position which allows free passage and vice versa, said jack being controlled by a photoelectric cell barrier which detects the transfer of an object from the feed conveyor on to the sliding surface.

5. Machine as claimed in claim 1, in which said intercepting means comprise a pair of jacks spaced apart by a distance substantially equal to the length of two transporters and operated in such a manner that when one jack is in the transporter intercepting position, the other is in the position which allows free passage and vice versa, said jacks being controlled by a photoelectric cell barrier which detects the transfer of an object from the feed conveyor on to the sliding surface.

* * * * *